Dec. 16, 1947.  S. E. WERNER ET AL  2,432,600
ELECTRO-MAGNETIC MOTOR
Filed Sept. 11, 1944  2 Sheets-Sheet 1

Inventors
S. E. Werner
A. O. Jorgensen
By [signature]
Attys.

Dec. 16, 1947.   S. E. WERNER ET AL   2,432,600
ELECTRO-MAGNETIC MOTOR
Filed Sept. 11, 1944   2 Sheets-Sheet 2

Inventors
S. E. Werner
A. O. Jörgensen

Patented Dec. 16, 1947

2,432,600

UNITED STATES PATENT OFFICE 2,432,600

ELECTROMAGNETIC MOTOR

Sture Eduard Werner and Anders Ossian Jörgensen, Stockholm, Sweden, assignors to Telefonaktiebolaget L. M. Ericsson, Stockholm, Sweden, a company of Sweden Application September 11, 1944, Serial No. 553,628
In Sweden July 9, 1943

5 Claims. (Cl. 172—36)

The present invention relates to an electromagnetic motor for operation in two directions of teletechnical devices, more particularly automatic telephone selectors, by means of electric impulses. The invention relates especially to a motor, in which the rotor turns one angular step at each impulse.

If selectors are used, in which the wipers, upon clearing of a communication, return to their starting position over the contacts in the multiple field over which they are set, it is desirable that the driving device can operate in two directions of motion, the one being setting direction and the other restoring direction. Previously, a spring was used as driving device for the restoring, said spring being set when the driving device steps out the selector. Naturally, the restoring will in that case be quick, but the rapidity of setting will be counteracted by the resistance of the spring which increases with the increasing distance of the wipers of the selector from the starting position. Consequently, the driving devices cannot be entirely exploited. Moreover, on the wiper's returning to starting position a hard shock is produced which may cause disturbances of other selectors in the same rack. The present invention has for an object a motor for two directions, eliminating said disadvantage. This is obtained mainly by arranging the motor with two separate stator windings and one centering device for the rotor in such a manner that the rotor is caused to rotate in accordance with the number of impulses in one direction on impulses being sent through one of the stator windings, and in the other direction on impulses being emitted through the other stator winding. Such a motor-driven selector affords a soft operation, great rapidity with full use of the driving device and, besides, the possibility of stopping the wipers during the restoring operation in other positions than the starting position.

The invention will be explained more in detail with reference to annexed drawings.

Figure 1:
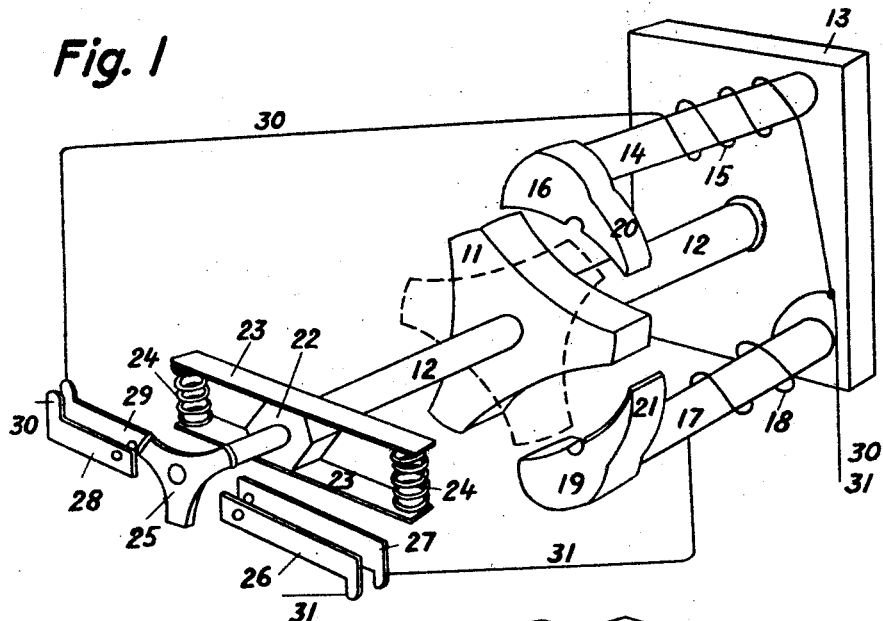
Figure 2:
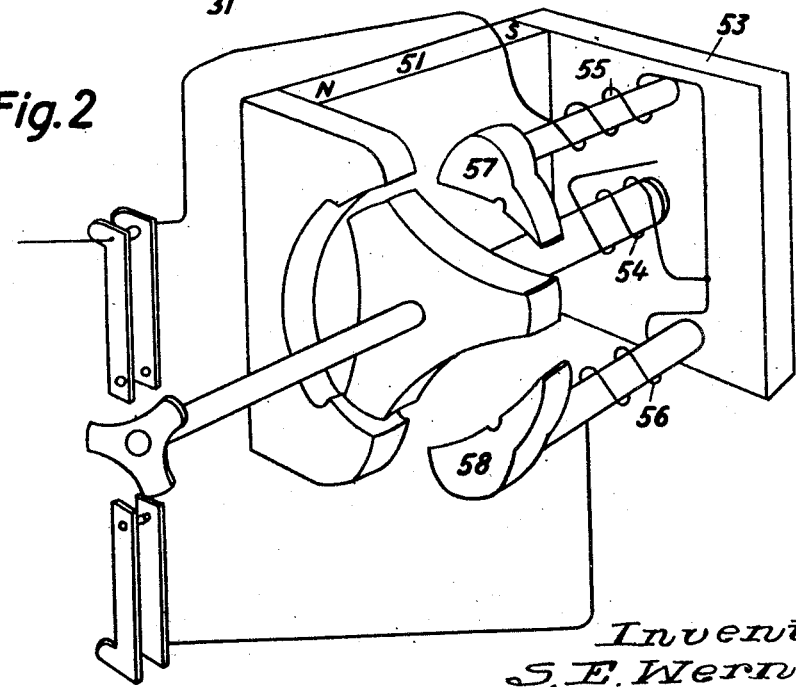
Figure 3:
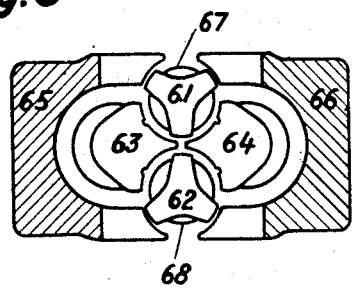
Figure 3A:
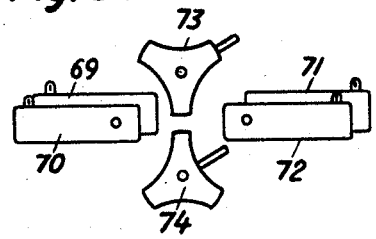
Figure 4:
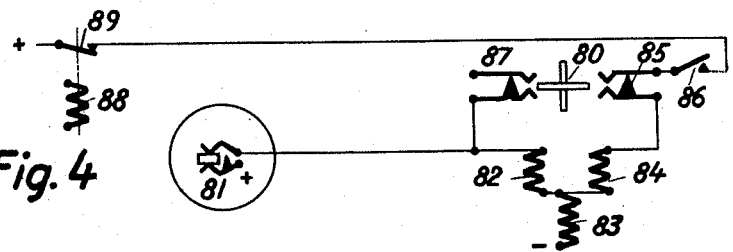
Figure 5:
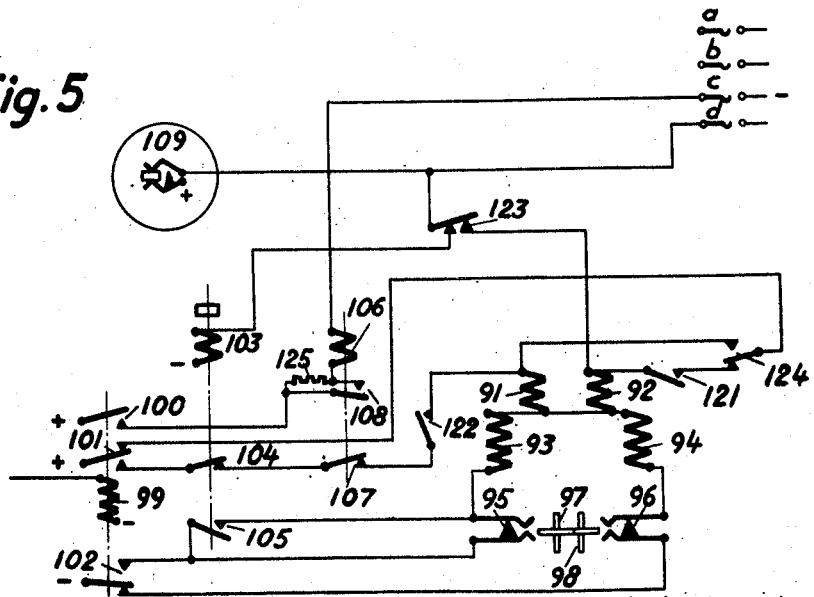

Figs. 1 and 2 show the principle of two different embodiments of a motor according to invention. Figs. 3 and 3a display the principal execution of two motors built together for operation of, for example, a selector which, at the setting, operates in two directions. Figs. 4 and 5 show different switching diagrams for the motor proposed. The drawings comprise only details necessary for a better understanding of the invention.

In the embodiment illustrated by Fig. 1 the rotor is composed of a three-point armature 11. Said armature is secured to an armature shaft 12, which is mounted on bearings on a yoke 13 and on parts of the motor not shown. The motor includes also among other things two electromagnets 14 and 17 with the windings 15 and 18, respectively, and the pole pieces 16 and 19, respectively. The pole pieces are provided with noses 20 and 21, respectively, for the operation of the direction of motion of the motor. In the example shown the middle points of the pole pieces are situated at an angular distance of 2×95° along that part of the circumference of the armature which runs along the noses 20, 21. On the extension of shaft 12 a six-parted symmetric stud 22 is provided. Two parallel sides of the stud rest against a pair of flat springs 23, the end points of which being drawn towards each other by means of two springs 24. Said set of springs which is attached to the rack of the motor by means of devices not shown retains the rotor in the position shown on de-energization of the motor. Shaft 12 has further a cam disk 25 of insulating material with three cams, which at the rotation of the shaft break or close, respectively, the contacts between two pairs of contact springs 26, 27 and 28, 29, respectively, which are connected in the circuits 30 and 31 through the motor windings 15 and 18, respectively.

Fig. 2 shows a modification of the design according to Fig. 1. However, the mechanical centering by means of springs against a six-parted stud in Fig. 1 is in this case replaced by a permanent-magnetic centering from a permanent magnet 51. A winding 54 is rigidly suspended in the rack around the rotor shaft. This winding is common to the circuits 55 and 56 of the two electro-magnets. The electro-magnets are provided with pole pieces 57 and 58, respectively, in the same way as the embodiment according to Fig. 1, and these pole pieces are situated at a distance of 2×70° from each other.

In the following, the operating manner of a motor designed according to the principles indicated will be described more in detail.

The armature, Fig. 1, is retained by the springs 23 in the starting position as shown. If a close of current takes place in circuit 31 through the motor winding 18, a flux is produced through electro-magnet 17, pole piece 19, nose 21, armature shaft 12 and yoke 13. The armature then turns clockwise one first part-step 95°, so that one of its poles is centered in front of the pole piece 19. This position of the armature is marked with dashed lines in the drawing. Simultaneously, the springs 23 have been pressed apart by the stud 22 and after a turning of 90° the stud is placed on edge. Upon turning by a further degree the spring set tends to press the stud clockwise, but the armature is retained after a turning of 95° by the flux through the pole piece 19. After interruption of the current in circuit 31 there remains only the action of the springs 23 upon stud 22. The armature continues to turn still another part-step (120–95°) until springs 23 adhere completely to the succeeding two plane surfaces on stud 22. The armature has then moved a complete angular step of 120°.

In the embodiment having a three-parted armature, as shown, the armature turns 120° by a complete impulse. At each succeeding impulse the armature turns in the same direction and manner as now described.

On turning of the armature in the direction from the normal position shown at a close of circuit 31, the three-parted cam disk 25 secured to the shaft also turns. Cam disk 25 breaks the contact between the contact springs 26, 27 as soon as the shaft has moved beyond 90° but less than 95°. This causes the rotor 12 to proceed automatically about 25° in the same direction and after that turning the cam of the cam disk having broken the contact between springs 26, 27 ceases to mesh with said springs, which thus in the starting position of the armature again close the circuit 31. Consequently, by means of said cut-off device—immediately after close of the circuit 31—the rotor 12 will be set in continuous rotation.

If circuit 30 is closed instead of circuit 31, a similar procedure will follow. The armature 11 turns counter-clockwise until one of its poles has come opposite pole piece 16, that is, an angular movement after the circumference of armature of 95°. It proceeds after the break of the current to the neutral position under the action produced by the pressure of springs 23 against the six-parted stud 22. If the self-interruptor actuated by cam disk 25 is connected to circuit 30, armature 11 starts a continuous rotative movement counter-clockwise. If said cut-off device is disconnected from circuit 30, 31, respectively, the armature moves one angular step at each impulse in this circuit. The embodiment according to Fig. 1 thus shows an impulse motor, wherein the same armature by means of only two circuits may be driven in two directions of motion, and in both directions in case of self-operation and step-by-step operation.

The embodiment described includes a six-parted stud 22. Should instead a three-parted stud be used and a flat spring which presses against a surface of the three-parted stud in the same way as the upper spring 23, Fig. 1, the middle points of the pole pieces may be placed at an angular distance from each other of about 2×70°. In such a case the stud has the tip placed against the spring after 60°. On the stud being moved further to 70° the armature is pressed clockwise by the action of the spring against the stud. When the flux through the pole piece ceases, the rotor therefore continues to turn another part-step (120°–70°). The cam disk 25 will in that case break the contact between springs 26 as soon as the shaft has turned somewhat more than 60°, but less than 70°, in which case an identical operating manner as above is obtained.

The embodiment according to Fig. 2 has chiefly the same operating manner as described above. The armature is centered in the neutral position by the flow from the permanent magnet 51. At a close of the current in circuit 55, a field is produced in coil 54 opposing the permanent field in shaft 52, causing the liberation of the armature from the centering. The pole piece 57 is magnetized, whereby the armature turns towards said pole piece counter-clockwise 70° in a manner similar to that shown in Fig. 1. At a break of current, when the armature has turned 70° counter-clockwise, one of the armature poles is so situated that the flow of the permanent magnet drives the armature counter-clockwise the remaining 50° to the neutral position. After the break of current the motor armature passes the neutral position somewhat but is drawn back by the permanent field, swings out quickly and stops in neutral position.

Fig. 3 illustrates how two motors according to Fig. 2 are built together. 61 and 62 designate the armatures of the two motors, 63 and 64 being electro-magnets, and 65 and 66 permanent magnets, the flows of which are closed through the armatures 61 and 62 as well as through the shafts of the armatures and a yoke not shown. The shafts of the armatures 61 and 62 are encircled by the fixed windings 67, 68 in relation to the rack. Two self-interruptors are comprised in the motor, one for each direction of motion. Said self-interruptors being common to both motors are shown in Fig. 3a, 73 and 74 designating cam disks of insulating material on the armature shafts for armatures 61 and 62, respectively. Further, there is a self-interruptor 69, 70 so arranged that it is actuated when cam disk 73 turns counter-clockwise and cam disk 74 turns clockwise. Another self-interruptor, also containing two contact springs 71, 72, is arranged to be actuated in case of reverse direction of motion of the two cam disks 73, 74. A double motor of similar design is described more in detail in the U. S. patent application Serial No. 522,668, now Patent Number 2,404,332, July 16, 1946. The operation of the motor in Figs. 3 and 3a according to the present application will be described with reference to Fig. 5.

Fig. 4 shows the principle of a switching diagram relating to a motor according to Fig. 2, which is presumed to be used as driving device for a final selector in an automatic telephone installation. Windings 82 and 84 correspond to windings 55 and 57, respectively, in Fig. 2 and winding 83 corresponds to winding 54. If now current impulses are emitted through windings 82, 83 from an impulse emitter, for example, dial 81 at a subscriber, the rotor will turn step by step according to the impulses in one direction, for example counter-clockwise. In known manner, the wipers of the appropriate selector are moved in one direction, for example from the normal position. If now the rotor is caused to move in the other direction, the wipers of the selector will in the ordinary way be stepped forward in the reverse direction, that is, back to normal position. With the switching diagram according to Fig. 4 this is achieved by connecting windings 83, 84 to a circuit over contacts 89 and 86 and a self-breaking contact 85. Said contact 85 corresponds, as is the case with contact 87 for example to the self-breaking contact 28, 29 and 26, 27, respectively, in Fig. 1, and it is actuated by a cam disk 80 in the same manner as described with reference to Fig. 1. Contact 86 is presumed to be a contact of a known execution which is broken in the starting position of the selector arms. The return movement of the selector is started in the ordinary way by means of a relay 88, when said relay closes its contact 89, and is interrupted at the break of contact 86. Said break by means of contact 86 should take place during the latter part of an angular step, that is when windings 84, 83 are de-energized.

Fig. 5 displays the principle of a group selector in connection with automatic telephone installations, which at its setting operates in two directions, X and Y. The motor according to Fig. 3 is assumed to be the driving device of the selector. Windings 91 and 92 carrespond to windings 67 and 68, respectively, and windings 93 and 94 correspond to electro-magnets 63 and 64, respectively. Details 97 and 98 correspond to the shafts supporting the armatures 61 and 62, respectively. Both shafts have common self-interruptors according to Fig. 3a and these have in Fig. 5 been designated 95 and 96, respectively. 95 acts as self-interruptor, when any of the shafts sets its devices, and 96, when the shafts restore the corresponding devices. The figure further shows a holding relay 99 with contacts 100, 101, 102, an impulse emission relay 103 which is slow-acting in release and provided with contacts 104 and 105, as well as a listening relay 106 with contacts 107 and 108, the latter of which being connected in parallel with a resistance. The selector wipers are termed a, b, c and d, and the home position contacts of the selector in the X-movement and Y-movement, respectively, are designated 121, 122, respectively, 123, 124. Uppermost, to the left, the subscriber's dial 109 is indicated.

One energization, in known manner, of relay 99 an impulse circuit is prepared over details 102, 95, 93, 92, 123 and dial 109. When an impulse train is emitted by the dial, relay 103 operates and remains in operated position during the entire train, in known manner. Contact 104 is broken and contact 105 closed, preventing the selector from entering into self-operation during the impulse train. The impulses now pass over contact 105 instead of interrupter 95. One rotor (X-rotor) follows the impulses of the dial and sets the wipers in the X-movement. When the impulse train is terminated, relay 103 is demagnetized, winding 91 thereby becoming energized over contact 104. At the same time follows removal of the short-circuit caused by self-interrupter 95 by means of contact 105. The other rotor (the Y-rotor) now enters into self-operation in a circuit over details 101, 104, 107, 122, 91, 93, 95 and 102, setting the wipers in the Y-movement. When the c-wiper of the selector finds a free wire in the multiple of the selector, a circuit is closed over the c-wire and relay 106 to contact 100. Listening relay 106 is actuated and breaks, by means of contact 107, said circuit. Said operation takes place during that part of the second impulse step, when the motor is de-energized. The rotor stops, whereupon the call is established in the ordinary way. On termination of the conversation, the holding relay 99 is released in known manner.

The Y-rotor is now set rotating in the other direction in a circuit 102, 96, 94, 91, 124, 101, and drives the wipers back in the Y-direction. After completion of this return, contact 124 is reversed and the X-rotor is driven in a direction reverse to the previous one in a circuit 101, 124, 121, 92, 94, 96, 102. In the home position contact 121 is broken and the rotor stops.

The principle of the invention may of course be applied to other embodiments than those displayed in the drawing. The number of poles may be arbitrary. The yoke mentioned may be replaced by armature and pole pieces arranged as those shown, causing the moment of the motor to be nearly redoubled at an equal dimensioning of the motor.

The field of application of the motor may be increased by letting the leakage fluxes of the electro-magnets 14 and 17, Fig. 1, actuate spring groups over some simple armature construction. Should, for example, core 14 project beyond pole piece 16 and the projecting part of the core be split lengthwise and one of the parts be encircled by a copper ring, a relay slow-acting in release is afforded which may be used for other switchings from the motor, for example for indication of restoring.

We claim:

1. In an electric motor, a step-wise movable rotor, two separate motor windings, means for periodically energizing one of said windings to initiate a step-wise movement of the rotor in one direction, means for periodically energizing the other winding to initiate a step-wise movement of the rotor in the opposite direction, and common means effective during movement of the rotor in either direction to complete the step-wise movement and center the rotor in position prior to initiation of the next step-wise movement.

2. A motor as claimed in claim 1 wherein said common means is constituted by a permanent magnet.

3. A motor as claimed in claim 1 wherein said common means is constituted by a cam and spring means coacting with said cam.

4. A motor as claimed in claim 1 provided with pole pieces supporting said windings, noses coacting with said rotor and projecting in opposite directions from the pole pieces, said common means being constituted by a permanent magnet.

5. A motor as claimed in claim 1 provided with pole pieces supporting said rotor and projecting in opposite directions from the pole pieces, said common means being constituted by a cam and spring means coacting with said cam.

STURE EDUARD WERNER.
ANDERS OSSIAN JÖRGENSEN.

REFERENCES CITED

The following references are of record in the file of this patent:

UNITED STATES PATENTS

| Number | Name | Date |
|---|---|---|
| 1,341,657 | Miller | June 1, 1920 |
| 1,971,130 | Chubb | Aug. 21, 1934 |
| 2,002,546 | Muller et al. | May 28, 1935 |